United States Patent
Ito et al.

(10) Patent No.: US 12,104,300 B2
(45) Date of Patent: Oct. 1, 2024

(54) FIBER ARTICLE

(71) Applicants: DAICEL CORPORATION, Osaka (JP); DAIKIN INDUSTRIES, LTD., Osaka (JP)

(72) Inventors: Yoshitaka Ito, Tokyo (JP); Masaya Omura, Tokyo (JP); Junko Makino, Tokyo (JP); Satoshi Hara, Osaka (JP); Hiroaki Shintani, Tokyo (JP)

(73) Assignees: DAICEL CORPORATION, Osaka (JP); DAIKIN INDUSTRIES, LTD., Osaka (JP)

( * ) Notice: Subject to any disclaimer, the term of this patent is extended or adjusted under 35 U.S.C. 154(b) by 333 days.

(21) Appl. No.: 17/637,599

(22) PCT Filed: Aug. 28, 2020

(86) PCT No.: PCT/JP2020/032653
§ 371 (c)(1),
(2) Date: Feb. 23, 2022

(87) PCT Pub. No.: WO2021/039980
PCT Pub. Date: Mar. 4, 2021

(65) Prior Publication Data
US 2022/0275546 A1    Sep. 1, 2022

(30) Foreign Application Priority Data
Aug. 30, 2019  (JP) .................. 2019-158826

(51) Int. Cl.
*D04H 1/4382* (2012.01)
*B01D 39/16* (2006.01)
*D04H 1/4318* (2012.01)

(52) U.S. Cl.
CPC ....... *D04H 1/4382* (2013.01); *B01D 39/1623* (2013.01); *D04H 1/4318* (2013.01);
(Continued)

(58) Field of Classification Search
CPC .... B01D 2239/0421; B01D 2239/0636; B01D 2239/064; B01D 2239/0645;
(Continued)

(56) References Cited

U.S. PATENT DOCUMENTS

| 5,662,728 A | 9/1997 | Groeger |
| 2014/0260990 A1 | 9/2014 | Kwok et al. |

FOREIGN PATENT DOCUMENTS

| JP | 2-91262 A | 3/1990 |
| JP | 6-116854 A | 4/1994 |

(Continued)

OTHER PUBLICATIONS

Extended European Search Report dated Aug. 7, 2023 for Application No. 20859257.6.
(Continued)

*Primary Examiner* — Lawrence D Ferguson
(74) *Attorney, Agent, or Firm* — Birch, Stewart, Kolasch & Birch, LLP

(57) ABSTRACT

A fiber article includes a plurality of first fibers and a plurality of second fibers each having an outer diameter smaller than that of each of the first fibers, the plurality of second fibers being supported in a dispersed state by the first fibers. A ratio D1/D2 of an outer diameter D1 of the first fiber to an outer diameter D2 of the second fiber is set to a value in a range of 15.0 or greater to 1666.7 or less. The outer diameter D1 is set to a value in a range of 5.0 μm or greater to 50.0 μm or less, and the outer diameter D2 is set to a value in a range of 30.0 nm or greater to 1.0 μm or less.

10 Claims, 3 Drawing Sheets

(52) U.S. Cl.
CPC ............... *B01D 2239/0636* (2013.01); *B01D 2239/0645* (2013.01); *B01D 2239/1233* (2013.01); *B01D 2239/1291* (2013.01); *D10B 2505/04* (2013.01)

(58) Field of Classification Search
CPC .... B01D 2239/1233; B01D 2239/1291; B01D 39/1623; B01D 39/18; D04H 1/4291; D04H 1/4318; D04H 1/4334; D04H 1/4382; D04H 1/43838; D04H 5/08; D10B 2505/04
See application file for complete search history.

(56) References Cited

FOREIGN PATENT DOCUMENTS

| | | |
|---|---|---|
| JP | 2011-17104 A | 1/2011 |
| JP | 2012-188774 A | 10/2012 |
| JP | 2014-205943 A | 10/2014 |
| WO | WO 2013/084760 A1 | 6/2013 |

OTHER PUBLICATIONS

English translation of the International Preliminary Report on Patentability for International Application No. PCT/JP2020/032653, dated Nov. 24, 2021.

FIBER ARTICLE

TECHNICAL FIELD

The present disclosure relates to a fiber article.

BACKGROUND ART

A fiber article is used, for example, as a filtration member that filters impurities mixed in fluid. A known example of a fiber article is a fiber article that includes different types of fibers, such as that disclosed in Patent Document 1.

CITATION LIST

Patent Document
Patent Document 1: JP H06-116854 A

SUMMARY OF INVENTION

Technical Problem

In a fiber article including different types of fibers, the function of each type of fiber is exerted and, to obtain sufficient performance of the fiber article, the state of each type of fiber is preferably kept stable.

In light of this, an object of the present disclosure is to provide a fiber article including different types of fibers in which the function of each type of fiber can be satisfactorily achieved and the state of each type of fiber in the fiber article can be kept stable.

Solution to Problem

In order to solve the above problem, a fiber article according to one aspect of the present disclosure includes a plurality of first fibers and a plurality of second fibers each having an outer diameter smaller than that of each of the first fibers, the plurality of second fibers being supported in a dispersed state by the first fibers. A ratio D1/D2 of an outer diameter D1 of the first fiber to an outer diameter D2 of the second fiber is set to a value in a range of 15.0 or greater to 1666.7 or less. The outer diameter D1 is set to a value in a range of 5.0 µm or greater to 50.0 µm or less, and the outer diameter D2 is set to a value in a range of 30.0 nm or greater to 1.0 µm or less.

According to the configuration described above, the second fibers each having an outer diameter significantly smaller than that of each of the first fibers are supported in a dispersed state by the first fibers, and thus the second fibers can be stably supported by the first fibers while being prevented from being cut. As a result, the state of each of the first fibers and the second fibers in the fiber article can be stably maintained while the first fibers and the second fibers are arranged in a manner that allows the functions of the first fibers and the second fibers to be achieved.

Additionally, when the outer diameter D1 of the first fiber, the outer diameter D2 of the second fiber, and the ratio D1/D2 are set as described above, relatively large gaps between fibers formed by the plurality of first fibers and relatively small gaps between fibers formed by the plurality of second fibers can be both formed abundantly in the fiber article. Consequently, for example, compared to a fiber article including only the second fibers, a fiber article having bulkiness can be obtained. Accordingly, fluid can be circulated abundantly in the fiber article and, for example, the fiber article can have a highly-efficient filtration function.

Further, the outer diameter D1 may be set to a value in a range of 20.0 µm or greater to 30.0 µm or less. When the outer diameter of the first fiber is set as just described, the size of the gap between the first fibers can be stabilized.

The first fibers may be crimped. As a result, the gaps between fibers can be formed abundantly in the fiber article, and the fiber article can be easily configured to be bulky.

Gaps between the plurality of first fibers and gaps between the plurality of second fibers may be formed inside the fiber article in a state where the second fibers are attached to the first fibers. As a result, abundant gaps between fibers can be formed in the fiber article while the second fibers are stably supported by the first fibers, and thus the function of the second fibers can be easily achieved.

The fiber article may be formed into a sheet shape having a thickness dimension of 3.0 mm or greater. Accordingly, the fiber article can be disposed in a fluid flow path, for example, to be easily brought into contact with fluid. Therefore, the functions of the first fibers and the second fibers can be easily achieved with respect to the fluid.

The fiber article may further include resin particles attached to the first fibers and made of a composition similar to that of the second fibers. A ratio V1/V2 of a total volume V1 of the first fibers and a total volume V2 of the second fibers and the resin particles may be set to a value in a range of 1.9 or greater to 124.0 or less. As a result, the second fibers having the small outer diameter and small volume can be stably supported by the first fibers having the large outer diameter and large volume, and the function of the second fibers can be more stably and easily achieved.

A pressure loss when air is passed through the fiber article at a flow rate of 5.3 cm/sec. may be set to a value in a range of 3 Pa or greater to 35 Pa or less. As a result, when the fluid is circulated through the fiber article, the circulation of the fluid can be appropriately prevented from being disturbed by the fiber article.

The first fibers may include at least one of rayon, polypropylene, polyethylene terephthalate, polyethylene, or cellulose acetate. As a result, the range of choice of the first fibers can be expanded, and the design flexibility of the fiber article can be improved.

The second fibers may be made of high molecules that can be fiberized. By using such high molecules, the second fibers can be efficiently manufactured.

The second fibers may include at least one of polytetrafluoroethylene, polypropylene, polyethylene, or polyamide. As a result, the range of choice of the second fibers can be expanded, and the design flexibility of the fiber article can be improved.

The second fibers may mainly include polytetrafluoroethylene. As a result, the high function of polytetrafluoroethylene can be stably achieved by the fiber article.

Advantageous Effects of Invention

According to aspects of the present disclosure, in a fiber article including different types of fibers, the function of each type of fiber can be satisfactorily achieved and the state of each type of fiber in the fiber article can be kept stable.

DESCRIPTION OF EMBODIMENTS

Figure 1:
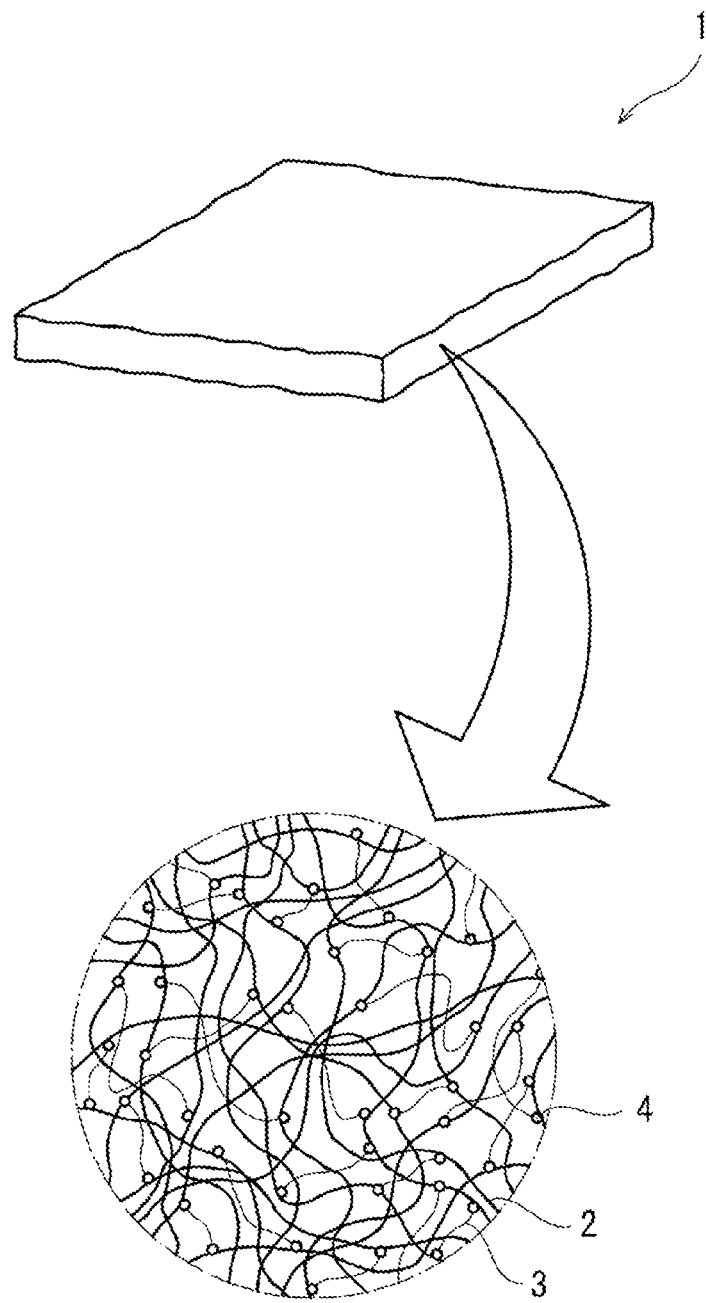
FIG. 1 is a schematic view of a fiber article according to an embodiment.

An embodiment will be described below with reference to the drawings. FIG. 1 is a schematic view of a fiber article 1 according to an embodiment. FIG. 1 further illustrates an enlarged view schematically illustrating an internal structure of the fiber article 1.

The fiber article 1 illustrated in FIG. 1 is used, for example, as a filtration member disposed in a flow path of fluid and configured to filter impurities mixed in the fluid. The fluid may be either gas or liquid. Here, the fiber article 1 has a sheet shape having a thickness dimension of 3.0 mm or greater. When the fiber article 1 has a sheet shape, the thickness dimension is set to a value in a range of, for example, 3.0 mm or greater to 10.0 mm or less. Additionally, the fiber article 1 has a basis weight set to a value in a range of 100.0 g/m$^2$ or greater to 400.0 g/m$^2$ or less (here, approximately 200 g/m$^2$).

The fiber article 1 includes a plurality of first fibers 2 and a plurality of second fibers 3. The first fibers 2 have strength (e.g., tensile strength) larger than that of the second fibers 3. The plurality of first fibers 2 are used as framework of the fiber article 1. The first fibers 2 of the present embodiment are crimped. By using the plurality of crimped first fibers 2, the fiber article 1 has a relatively low fiber density and is formed to be bulky.

The second fibers 3 each have an outer diameter smaller than that of each of the first fibers 2 and are supported in a dispersed state by the first fibers 2. In the present embodiment, the second fibers 3 are disposed dispersed throughout the inside of the fiber article 1. In the fiber article 1, a ratio D1/D2 of an outer diameter D1 of the first fiber 2 to an outer diameter D2 of the second fiber 3 is set to a value in a range of 15.0 or greater to 1666.7 or less. As described above, the fiber article 1 includes the first fibers 2 having the outer diameter D1 that is large and the second fibers 3 having the outer diameter D2 that is considerably smaller than that of the first fibers 2.

For example, the ratio D1/D2 is preferably set to a value in a range of 15.0 or greater to 1300.0 or less. Also, the ratio D1/D2 is further preferably set to a value in a range of 15.0 or greater and 714.3 or less, and is still further preferably set to a value in a range of 15.0 or greater to 300.0 or less.

In yet another example, the ratio D1/D2 can be set to a value in a range of 60.0 or greater to 1666.7 or less. Further, the ratio D1/D2 is preferably set to a value in a range of 60.0 or greater to 1300.0 or less. Furthermore, the ratio D1/D2 is even more preferably set to a value in a range of 60.0 or greater to 714.3 or less, and is still further preferably set to a value in a range of 60.0 or greater to 300.0 or less.

The outer diameter D1 is set to a value in a range of 5.0 μm or greater to 50.0 μm or less. By setting the outer diameter D1 to a value in such a range, the second fibers 3 can be appropriately extended around the first fibers 2. Further, the outer diameter D1 is preferably set to a value in a range of 20.0 μm or greater to 30.0 μm or less.

The outer diameter D2 is set to a value in a range of 30.0 nm or greater to 1.0 μm or less. By setting the outer diameter D2 to a value in such a range, the difference between the outer diameters of the first fiber 2 and the second fiber 3 is clearly defined, and the second fibers 3 can be prevented from being excessively thin, and the second fibers 3 can be easily manufactured. The outer diameter D2 is further preferably set to a value in a range of 30.0 nm or greater to 800 nm or less, and is still further preferably set to a value in a range of 30.0 nm or greater to 166.7 nm or less. In yet another example, the outer diameter D2 is preferably set to a value in a range of 50.0 nm or greater to 800.0 nm or less.

In the fiber article 1, for example, a ratio V1/V2 of the total volume V1 of the first fibers 2 to the total volume V2 of the second fibers 3 and resin particles 4 is set to a value in a range of 1.9 or greater to 124.0 or less. The ratio V1/V2 is further preferably set to a value in a range of 20.0 or greater to 124.0 or less. By setting the ratio D1/D2 and the ratio V1/V2 to values in the ranges described above, the outer diameter D1 of the first fiber 2 and the outer diameter D2 of the second fiber 3 can be varied, and thus the functions of each of the fibers 2, 3 can be easily achieved.

In the fiber article 1, gaps between the plurality of first fibers 2 and gaps between the plurality of second fibers 3 are formed inside the fiber article 1 in a state where the second fibers 3 are attached to the crimped first fibers 2. In other words, a net structure of the first fibers 2 and the second fibers 3 is formed inside of the fiber article 1. Since the second fibers 3 are attached to the first fibers 2, the net structure is less likely to break even when subject to a certain degree of external force while the fiber article 1 is in use.

As just described, many gaps between fibers are provided inside of the fiber article 1. Therefore, the fiber article 1 has relatively low pressure loss when fluid is circulated in the fiber article 1. In the fiber article 1 of the present embodiment, pressure loss when air is passed through the fiber article 1 at a flow rate of 5.3 cm/sec. is set to a value in a range of 3 Pa or greater to 35 Pa or less. Another example of a preferable value for the pressure loss is a value in a range of, for example, 5 Pa or greater to 35 Pa or less or a value in a range of 15 Pa or greater to 35 Pa or less.

The pressure loss can be measured with a common pressure loss measuring apparatus by the following procedure. In other words, a measurement sample is set on a holder having an inner diameter of 113 mm (effective area of 100 cm$^2$ for a filtration member), and the flow rate of air circulating through the measurement sample is adjusted by a flow meter to be 5.3 cm/sec. The pressure loss generated between the upstream side and the downstream side in the circulation direction of the air in the measurement sample at this time can be measured with a manometer.

Further, within the fiber article 1, the second fibers 3 are supported on the first fibers 2 while being intertwined with the first fibers 2. Accordingly, even when the outer diameter D2 of each second fiber 3 is smaller than the outer diameter D1 of each first fiber 2, the second fibers 3 can be supported by the first fibers 2 while preventing damage such as cutting of the second fibers 3. Therefore, the function of the second fibers 3 can be maintained over a long period of time.

The value of the ratio D1/D2 can be set as appropriate provided that the ratio D1/D2 is in a range of 15.0 or greater to 1666.7 or less. When the value of the ratio D1/D2 is less than 15.0, the effect of achieving functions of two types of fibers having different outer diameters in the fiber article 1 is reduced. Furthermore, when the value of the ratio D1/D2 exceeds 1666.7, for example, the outer diameter D1 is too large and the second fibers 3 cannot easily extend around the first fibers 2. Also, the outer diameter D2 is too small to easily form the second fiber 3. Consequently, it is difficult to manufacture the fiber article 1.

By setting the ratio D1/D2 to the value in the range described above, the weight of the second fibers 3 used in the fiber article 1 can be reduced. As a result, the amount of the second fibers 3 used in manufacturing the fiber article 1 can be reduced. Accordingly, the second fibers 3 having the high function can be suitably used as a material of the fiber article 1 while production costs of the fiber article 1 are reduced. Thus, in the present embodiment, the design flexibility of the second fiber 3 is improved.

The fiber article 1 of the present embodiment includes the resin particles 4 that are attached to the first fibers 2 and made of a composition similar to that of the second fiber 3. The resin particles 4 are formed of high molecules that can be fiberized. In the fiber article 1, when the first fibers 2 are opened in a state where the resin particles 4 are attached to the plurality of crimped first fibers 2, an external force is applied to the resin particles 4 and the second fibers 3 are formed from the resin particles 4. As illustrated in the enlarged view of FIG. 1, the resin particles 4 may slightly remain in the manufactured fiber article 1. Note that the resin particles 4 may not remain in the fiber article 1 due to the method of manufacturing the fiber article 1 or the like.

The resin particle 4 internally includes a lamellar structure. The lamellar structure herein corresponds to a structure in which polymer chains constituting a resin of the resin particles 4 are linked and folded. The lamellar structure internally included in the resin particle 4 comprises fine fibers, specifically, in which millions of the polymer chains are linked and formed into a ribbon shape. The fine fibers are folded and contained in the resin particle 4. The resin particles 4 can be formed, for example, by paste extrusion.

Next, details of the first fibers 2 will be described. The material of the first fibers 2 can be selected as appropriate. As described above, in a case where the second fibers 3 are formed from the resin particles 4 at the time of manufacturing the fiber article 1, the resin particles 4 are attached to the first fibers 2 by bringing an aqueous dispersion including the resin particles 4 in a dispersed state (hereinafter, simply referred to as aqueous dispersion) into contact with the first fibers 2. In this case, a water contact angle θ1 immediately after dropping water droplets onto the surface of the first fibers 2 is preferably set to a somewhat low value in order to increase affinity of the first fibers 2 to the aqueous dispersion. Accordingly, the first fibers 2 include, as an example of the material, at least one of rayon, polypropylene (PP), polyethylene terephthalate (PET), polyethylene (PE), or cellulose acetate. The first fibers 2 of the present embodiment are cellulose acetate fibers. The fiber article 1 includes the first fibers 2 formed by crimping and opening a tow (tow band) that includes a plurality of cellulose acetate fibers. Therefore, the fiber article 1 has good bulkiness.

The first fibers 2 are long fibers that are longer than the second fibers 3. When the first fibers 2 are crimped long fibers, for example, even when the number of first fibers 2 is small, many second fibers 3 can be stably supported by the first fibers 2. Note that the first fibers 2 are not limited to long fibers, and may be short fibers.

At least any (here both) of an oil emulsion including textile oil and water and used in spinning cellulose acetate fibers (hereinafter simply referred to as an oil emulsion), and water used in crimping cellulose acetate fibers is (are) applied to the surface of the first fibers 2 of the present embodiment. Therefore, the surface of the first fibers 2 is hydrophilic.

When the aqueous dispersion is used in manufacturing the fiber article 1, the water contact angle θ1 is preferably a value in a range of, for example, 10° or greater to 40° or less to impart affinity (hydrophilia) with the aqueous dispersion to the first fibers 2. The water contact angle θ1 is more preferably a value in a range of 20° or greater to 35° or less.

The water contact angle θ1 can be adjusted, for example, by the application amount of at least one of water or oil emulsion on the surface of the first fibers 2. For example, when the application amount is increased, the water contact angle θ1 increases, and when the application amount is reduced, the water contact angle θ1 decreases. The water contact angle θ1 may be adjusted by bringing a different component from water or oil emulsion into contact with the surface of the first fibers 2.

The cross-sectional shape of the first fiber 2 can be set as appropriate. The cross-sectional shape of the first fiber 2 can be set to any of, for example, a circular shape, a Y-shape, or an irregular shape. By changing the cross-sectional shape of the first fiber 2, for example, the surface area of the first fibers 2 can be adjusted. In a certain range, a greater variation in the cross-sectional shapes of the first fibers 2 results in greater the surface area of the first fibers 2. As a result, the first fibers 2 can be easily brought into contact with the second fibers 3 or fluid.

Specifically, the cross-sectional shape of the first fiber 2 can be adjusted, for example, by changing the peripheral shapes of spinning holes in the case of spinning the first fibers 2 by a dry spinning method. Herein, the outer diameter D1 of the first fiber 2 and the outer diameter D2 of the second fiber 3 can be calculated, for example, as an average value of the maximum outer diameters of the fiber cross-sections appearing in captured images of a plurality of the first fibers and a plurality of the second fibers (here, ten fibers of each of the first fibers and the second fibers). The fiber article 1 may include a plurality of the first fibers 2 having different cross-sectional shapes.

Next, details of the second fibers 3 will be described. The second fibers 3 are disposed intersecting with the first fibers 2 and are attached to the first fibers 2. The second fibers 3 of the present embodiment are attached to the first fibers 2 by van der Waals force. Accordingly, the first fibers 2 and the second fibers 3 have good affinity with each other. The second fibers 3 are made of, for example, high molecules that can be fiberized.

The second fibers 3 preferably include, as high molecules that can be fiberized, at least one of polytetrafluoroethylene (hereinafter, also referred to as PTFE), polypropylene (PP), polyethylene (PE), or polyamide (PA). The second fibers 3 of the present embodiment mainly include PTFE (in other words, more than 50% by weight of the total weight). The second fibers 3 are ultrafine fibers of PTFE.

The PTFE used as the material of the second fibers 3 will be described. The PTFE is configured as high molecules that can be fiberized. Such PTFE is high molecular weight PTFE obtained from, for example, emulsion polymerization or suspension polymerization of TFE. The high molecular weight PTFE may be at least any of modified PTFE or homo PTFE.

The modified PTFE consists of TFE and a monomer (modified monomer) other than TFE. Typically, the modified PTFE is uniformly denatured by the modified monomer or is denatured at the early or end stage of a polymerization reaction, but the modified PTFE is not particularly limited. The modified PTFE includes a TFE unit based on TFE and a modified monomer unit based on a modified monomer.

In addition, the modified monomer unit is a part of a molecular structure of the modified PTFE, and is a part derived from the modified monomer. The total monomer unit is derived from all monomers in the molecular structure of the modified PTFE. As long as the modified monomer can be copolymerized with TFE, the modified monomer is not particularly limited.

Herein, "high molecular weight" of the high molecular weight PTFE refers to a molecular weight at which the PTFE is easily fiberized at the time of manufacturing the fiber article 1 and at which fibrils having a long fiber length are obtained. The high molecular weight is a value of a standard specific gravity (SSG) in a rage of 2.130 or greater and 2.230 or less, and indicates a molecular weight at which melt flow substantially does not occur due to high viscosity. Note that, for information regarding PTFE that can be fiberized, for example, WO 2013/157647 can be referred to.

In a case where the aqueous dispersion is used in manufacturing the fiber article 1, a water contact angle θ2 immediately after dropping water droplets onto the surface of the fiber article 1 is set to a somewhat low value in consideration of hydrophilia with the aqueous dispersion. For example, the water contact angle θ2 is preferably a value in the same range as the water contact angle θ1.

The water contact angles θ1, θ2 can be measured, for example, by observing the surface of a target object on which water droplets have been dropped, from the side of the water droplets with a microscope. Specifically, the water contact angles θ1, θ2 are calculated as an average value of measurement values obtained, for example, by using a commercially available contact angle meter (contact angle meter "DMs-401" available from Kyowa Interface Science Co., Ltd.), dropping water droplets onto a target object, and measuring the contact angles by five-point measurement.

In the present embodiment, an example where the water contact angles θ1, θ2 are set to relatively low values in order to increase the affinity of the first fibers 2 to the aqueous dispersion is described, but the water contact angles θ1, θ2 may be set to relatively high values, for example, in accordance with characteristics of a dispersion that disperses the resin particles 4. In addition, in order to increase affinity to the first fibers 2, the dispersion liquid containing the resin particles 4 in a dispersed state may be adjusted, whereby, for example, the contact angle to the surface of the first fibers 2 is low. In addition, in a case where the fiber article 1 is manufactured, for example, by bringing the resin particles 4 in powder form into contact with the first fibers 2 without using the dispersion liquid, the water contact angles θ1, θ2 can be set to somewhat free values.

As described above, according to the fiber article 1, the second fibers 3 each having an outer diameter significantly smaller than that of each of the first fibers 2 are supported in a dispersed state by the first fibers 2, and thus the second fibers 3 can be stably supported by the first fibers 2 while being prevented from being cut. As a result, the state of each of the first fibers 2 and the second fibers 3 in the fiber article 1 can be kept stable while the first fibers 2 and the second fibers 3 are arranged in a manner that allows the functions of the first fibers and the second fibers to be achieved.

Additionally, when setting the outer diameter D1 of the first fiber 2, the outer diameter D2 of the second fiber 3, and the ratio D1/D2 as described above, relatively large gaps between fibers formed by the plurality of first fibers 2 and relatively small gaps between fibers formed by the plurality of second fibers 3 can be both formed abundantly in the fiber article 1. Consequently, for example, compared to a fiber article 1 including only the second fibers 3, the fiber article 1 having bulkiness can be obtained. Accordingly, fluid can be circulated abundantly in the fiber article 1 and, for example, the fiber article 1 can have a highly-efficient filtration function.

Further, the fine second fibers 3 having the outer diameter D2 of 1.0 μm or less are combined with the first fibers 2 having the relatively large outer diameter D1, and the second fibers 3 are supported by the first fibers 2. Therefore, for example, compared to the fiber article 1 manufactured only with resin fibers, the fiber article 1 having bulkiness can be produced, and it is possible to manufacture the fiber article 1 that can achieve the function of the second fibers 3 over a long period of time.

Furthermore, the fiber article 1 has the outer diameter D1 set to a value in a range of 5.0 μm or greater to 50.0 μm or less. As a result, the strength of the first fibers 2 can be improved, and the function of the second fibers 3 can be achieved with the second fibers 3 stably supported by the first fibers 2.

In addition, in the fiber article 1, the outer diameter D1 is set to a value in a range of 20.0 μm or greater to 30.0 μm or less. When the outer diameter of the first fiber 2 is set as described, the size of the gap between the first fibers 2 can be stabilized.

Further, in the fiber article 1, the first fibers 2 are crimped. As a result, the gaps between fibers can be formed abundantly in the fiber article 1, and the fiber article 1 can be easily configured to be bulky.

Furthermore, the gaps between the plurality of first fibers 2 and the gaps between the plurality of second fibers 3 are formed inside the fiber article 1 in a state where the second fibers 3 are attached to the crimped first fibers 2. As a result, abundant gaps between fibers can be formed in the fiber article 1 while the second fibers 3 are stably supported by the first fibers 2, and thus the function of the second fibers 3 can be easily achieved.

Moreover, the fiber article 1 is formed into a sheet shape having a thickness dimension of 3.0 mm or greater. Accordingly, the fiber article 1 can be disposed in a fluid flow path, for example, to be easily brought into contact with fluid. Therefore, the functions of the first fibers 2 and the second fibers 3 can be easily achieved with respect to the fluid.

Further, the fiber article 1 of the present embodiment includes the resin particles 4 that are attached to the first fibers 2 and made of a composition similar to that of the second fibers 3. The ratio V1/V2 of the total volume V1 of the first fibers 2 to the total volume V2 of the second fibers 3 and the resin particles 4 is set to a value in a range of 1.9 or greater to 124.0 or less. As a result, the second fibers 3 having the small outer diameter and small volume can be stably supported by the first fibers 2 having the large outer diameter and large volume, and the function of the second fibers 3 can be more stably and easily achieved.

Furthermore, the pressure loss of the fiber article 1 when air is passed through the fiber article 1 at a flow rate of 5.3 cm/sec. is set to a value in a range of 3 Pa or greater to 35 Pa or less. As a result, when fluid is circulated through the fiber article 1, the circulation of the fluid can be appropriately prevented from being disturbed by the fiber article 1.

Additionally, in the fiber article 1, the first fibers 2 are at least one of rayon, polypropylene, polyethylene terephthalate, polyethylene, or cellulose acetate. As a result, the range of choice of the first fibers 2 can be expanded, and the design flexibility of the fiber article 1 can be improved.

Further, in the fiber article 1, the second fibers 3 are formed of high molecules that can be fiberized. By using such high molecules, the second fibers 3 can be efficiently manufactured. Furthermore, in the fiber article 1, the second fibers 3 include at least one of polytetrafluoroethylene, polypropylene, polyethylene, or polyamide. As a result, the range of choice of the second fibers 3 can be expanded, and the design flexibility of the fiber article 1 can be improved.

Additionally, in the fiber article 1, the second fibers 3 mainly include polytetrafluoroethylene. As a result, the high function of polytetrafluoroethylene can be stably achieved by the fiber article 1.

Confirmation Test

A confirmation test will be described next, but the present disclosure is not limited to the Examples described below.

Test 1

Figure 2:
FIG. 2 is an SEM photograph of a fiber article according to Examples.
Figure 3:
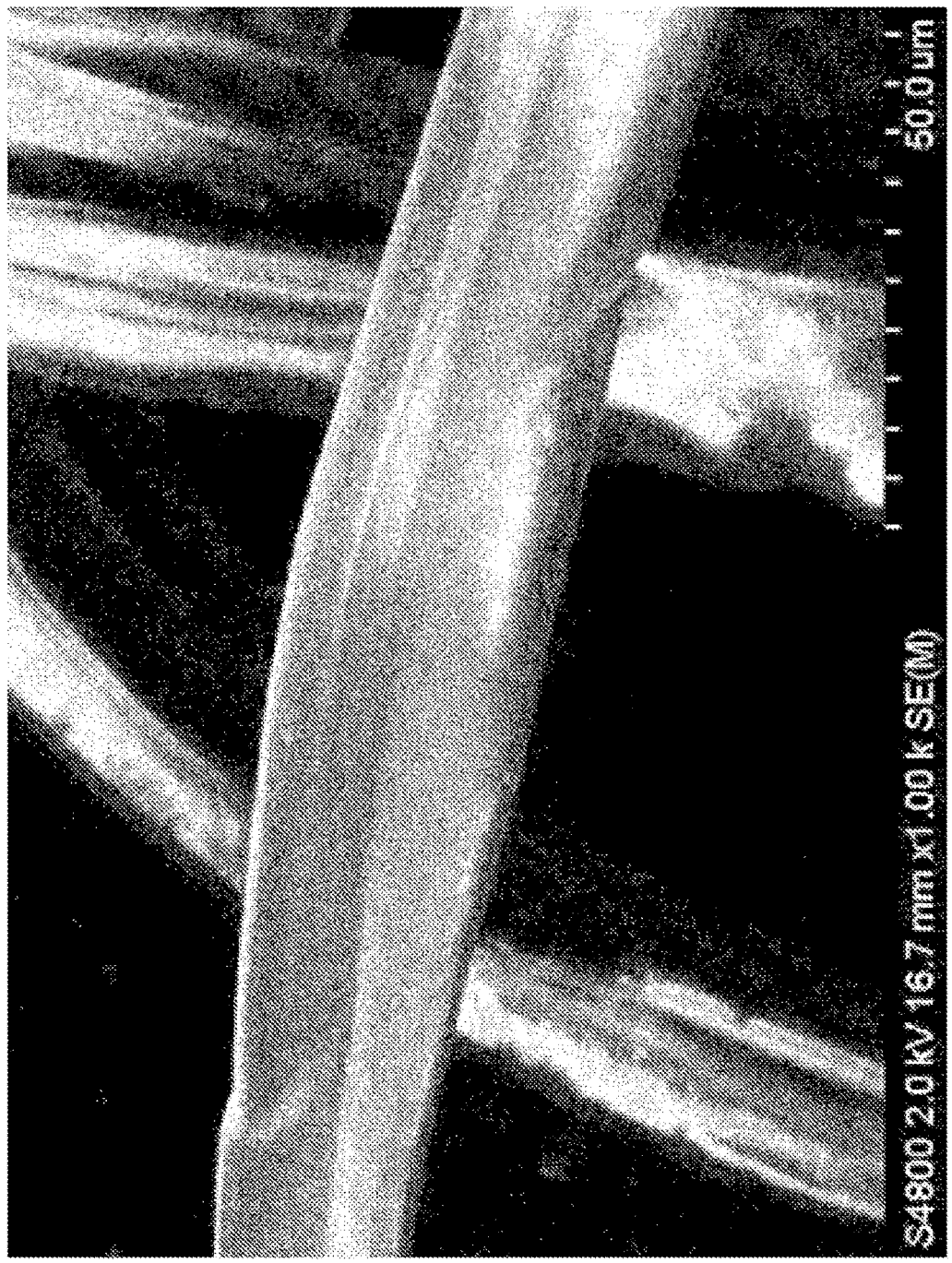
FIG. 3 is an SEM photograph of a fiber article according to Comparative Examples.

The outer diameter D1 was set to 20 μm by adjusting the spinning conditions, and cellulose acetate fibers, which are crimped long fibers, were used as the first fibers 2. In addition, by adjusting the composition of the resin particles 4 and the stretching conditions of the resin particles 4 associated with opening of the first fibers 2, PTFE fibers having the outer diameter D2 set to 70 nm were used as the second fibers 3. The fibers 2, 3 were used to manufacture the fiber article 1 of the Examples. FIG. 2 is an SEM (Scanning Electron Microscope) photograph of the fiber article according to the Examples. In FIG. 2, the magnification is increased more than the magnification of FIG. 1. In addition, a fiber article of Comparative Examples having a configuration similar to that of the Example was manufactured with the exception that the second fibers 3 were omitted. FIG. 3 is an SEM photograph of the fiber article according to Comparative Examples.

As illustrated in FIG. 2, in the fiber article 1 of the Examples, it was confirmed that the plurality of second fibers 3, which are ultrafine fibers having the outer diameter D2 significantly smaller than the outer diameter D1, are supported by the first fibers 2 while being attached to the first fibers 2. It was also confirmed that the plurality of second fibers 3 are disposed intersecting each other in the gaps between the plurality of first fibers 2 and that a mesh structure formed of the plurality of second fibers 3 is formed. As a result, the fiber article 1 of the Examples is formed to be bulky. Also, the fiber article of the Examples is considered to have superior filtration performance. In contrast to this, as illustrated in FIG. 3, it was confirmed that the fiber article of the Comparative Examples is simply formed with gaps between fibers of only of the first fibers. Therefore, the fiber article of the Comparative Examples is considered to have filtration performance lower than that of the fiber article of the Examples.

Test 2

As in Examples 1 to 3 and Comparative Examples 1 to 3 illustrated below, confirmation tests were performed to determine whether, in the case of manufacturing a fiber article by using two types of fibers having the outer diameters D1, D2 set to predetermined values, the fiber article can be manufactured. In the present tests, as a method for manufacturing the fiber article, a method was employed in which resin particles made of high molecules (PTFE) that can be fiberized are brought into contact with a plurality of crimped first fibers made of cellulose acetate fibers, and thereafter the plurality of first fibers are opened and second fibers are formed from the resin particles. The results are indicated in Table 1.

TABLE 1

|  | D1 (μm) | D2 (nm) | Ratio D1/D2 | Fiber article |
|---|---|---|---|---|
| Example 1 | 10.0 | 120.0 | 83.3 | Manufacturable |
| Example 2 | 20.0 | 70.0 | 285.7 | Manufacturable |
| Example 3 | 50.0 | 40.0 | 1250.0 | Manufacturable |
| Comparative Example 1 | 20.0 | 20.0 | 1000.0 | Not manufacturable |
| Comparative Example 2 | 60.0 | 20.0 | 3000.0 | Not manufacturable |
| Comparative Example 3 | 60.0 | 70.0 | 857.1 | Not manufacturable |

As indicated in Table 1, it was found that in Examples 1 to 3, the fiber article 1 having the structure illustrated in FIG. 2 can be manufactured. Therefore, it was confirmed that the fiber article 1 can be manufactured at least when the outer diameter D1 of the first fiber 2 is set to a value in a range of 10 μm or greater to 50 μm or less, the outer diameter D2 of the second fiber 3 is set to a value in a range of 40 nm or greater to 120 nm or less, and the ratio D1/D2 is set to a value in a range of 83.3 or greater to 1250.0 or less.

In contrast to this, in any of the Comparative Examples 1 to 3, it was confirmed that a fiber article cannot be manufactured. Of these Examples, it was confirmed that the outer diameter D2 (20.0 nm) in Comparative Examples 1, 2 is a value at which the second fibers cannot be manufactured even when the composition or raw material type of the resin particles serving as the source of the second fibers or the stretching conditions of the resin particles are adjusted. In Comparative Example 3, it was confirmed that the outer diameter D1 (60.0 μm) is too thick and the fiber gap is too large. Therefore, it is difficult for the first fibers to hold the second fibers. As a result, superiority of Examples 1 to 3 to Comparative Examples 1 to 3 was confirmed. Additionally, the results of different confirmation tests revealed that when the ratio D1/D2 is set to a value in a range of 15.0 or greater to 1666.7 or less, which is different from Examples 1 to 3, the same results as Examples 1 to 3 are obtained. It was also found that the lower limit of the outer diameter D2 of the second fiber 3 that can be manufactured is 30.0 nm.

Test 3

Next, the fiber articles 1 of Examples 4 to 9, which are filtration members, were configured with different combinations of the filtration member thickness and the filtration member basis weight. For these Examples 4 to 9, pressure loss, collection efficiency, and PF value were measured. The pressure loss was measured under a condition when air was passed through the fiber article 1 at a flow rate of 5.3 cm/sec. The collection efficiency was measured as collection efficiency of particles when air containing NaCl particles having a particle size of 0.3 μm was passed through the fiber article 1 at a flow rate of 5.3 cm/sec. The PF value was calculated based on Equation 1 below.
[Equation 1]

The configurations and measurement results of Examples 4 to 9 are indicated in Table 2 below.

TABLE 2

|  | D1 (μm) | D2 (nm) | Ratio D1/D2 | Filtration member thickness (mm) | Filtration member basis weight (g/m²) | Pressure loss (Pa) | Collection efficiency (%) | PF |
|---|---|---|---|---|---|---|---|---|
| Example 4 | 14.64 | 0.06 | 244 | 3.0 | 128 | 4.8 | 41.2 | 48.6 |
| Example 5 | 14.64 | 0.06 | 244 | 3.0 | 133 | 6.1 | 50.2 | 49.7 |
| Example 6 | 14.64 | 0.06 | 244 | 3.0 | 149 | 5.1 | 43.4 | 49.0 |
| Example 7 | 14.64 | 0.06 | 244 | 4.0 | 122 | 5.3 | 43.4 | 46.6 |
| Example 8 | 14.64 | 0.06 | 244 | 4.0 | 153 | 4.6 | 48.5 | 62.9 |
| Example 9 | 14.64 | 0.06 | 244 | 3.0 | 134 | 6.1 | 58.0 | 62.1 |

As indicated in Table 2, it was found that in Examples 4 to 9, favorable values are indicated for all of the pressure loss, the collection efficiency, and the PF value.

Note that each of the configurations, the combinations thereof, or the like in each of the embodiments are examples, and additions, omissions, replacements, and other changes to the configurations may be made as appropriate without departing from the spirit of the present disclosure. The present disclosure is not limited by the embodiments and is limited only by the claims. The aspects disclosed in the present specification can be combined with any other feature disclosed herein. The fiber article 1 is not limited to a sheet shape, and may have another shape (e.g., a rectangular shape, a columnar shape, a spherical shape, or a polygonal shape). Additionally, a plurality of the fiber articles 1 may be used in combination.

INDUSTRIAL APPLICABILITY

As described above, according to the present disclosure, highly advantageously, in the fiber article including different types of fibers, the function of each type of fiber can be satisfactorily achieved and the state of each type of fiber in the fiber article can be kept stable. It is thus advantageous to widely apply the disclosure as a fiber article that can exert the significance of the effects.

REFERENCE SIGNS LIST

1 Fiber article
2 First fiber
3 Second fiber
4 Resin particle

The invention claimed is:

1. A fiber article, comprising:
a plurality of first fibers; and
a plurality of second fibers each having an outer diameter smaller than that of each of the first fibers, the second fibers being supported in a dispersed state by the first fibers,
wherein the first fibers consist of one of rayon, polypropylene, polyethylene terephthalate, polyethylene, or cellulose acetate, and the second fibers include at least one of polytetrafluoroethylene, polypropylene, polyethylene, or polyamide, where the first fibers consist of a material different from that of the second fibers,
a ratio D1/D2 of an outer diameter D1 of the first fiber to an outer diameter D2 of the second fiber is set to a value in a range of 15.0 or greater to 1666.7 or less,
the outer diameter D1 is set to a value in a range of 14.64 μm or greater to 50.0 μm or less, and
the outer diameter D2 is set to a value in a range of 30.0 nm or greater to 800 nm or less.

2. The fiber article according to claim 1, wherein the outer diameter D1 is set to a value in a range of 20.0 μm or greater to 30.0 μm or less.

3. The fiber article according to claim 1, wherein the first fibers are crimped.

4. The fiber article according to claim 1, wherein gaps between the plurality of first fibers and gaps between the plurality of second fibers are formed inside the fiber article in a state where the second fibers are attached to the first fibers.

5. The fiber article according to claim 1, being formed into a sheet shape having a thickness dimension of 3.0 mm or greater.

6. A fiber article comprising:
a plurality of first fibers;
a plurality of second fibers each having an outer diameter smaller than that of each of the first fibers, the second fibers being supported in a dispersed state by the first fibers; and
resin particles attached to the first fibers and made of a composition similar to that of the second fibers,
wherein the second fibers include at least one of polytetrafluoroethylene, polypropylene, polyethylene, or polyamide,
the first fibers include a material different from that of the second fibers,
a ratio D1/D2 of an outer diameter D1 of the first fiber to an outer diameter D2 of the second fiber is set to a value in a range of 15.0 or greater to 1666.7 or less,
the outer diameter D1 is set to a value in a range of 14.64 μm or greater to 50.0 μm or less,
the outer diameter D2 is set to a value in a range of 30.0 nm or greater to 800 nm or less, and
a ratio V1/V2 of a total volume V1 of the first fibers and a total volume V2 of the second fibers and the resin particles is set to a value in a range of 1.9 or greater to 124.0 or less.

7. The fiber article according to claim 1, wherein a pressure loss when air is passed through the fiber article at a flow rate of 5.3 cm/sec. is set to a value in a range of 3 Pa or greater to 35 Pa or less.

8. The fiber article according to claim 1, wherein the second fibers are made of a polymer that can be fiberized.

9. The fiber article according to claim 1, wherein a water contact angle is a value in a range of 10° or greater to 40° or less.

10. A fiber article comprising:
a plurality of first fibers; and
a plurality of second fibers each having an outer diameter smaller than that of each of the first fibers, the second fibers being supported in a dispersed state by the first fibers,
wherein the second fibers mainly include polytetrafluoroethylene,
the first fibers include a material different from that of the second fibers,
a ratio D1/D2 of an outer diameter D1 of the first fiber to an outer diameter D2 of the second fiber is set to a value in a range of 15.0 or greater to 1666.7 or less,
the outer diameter D1 is set to a value in a range of 14.64 μm or greater to 50.0 μm or less, and
the outer diameter D2 is set to a value in a range of 30.0 nm or greater to 800 nm or less.

* * * * *